(12) United States Patent
Parla et al.

(10) Patent No.: US 11,902,168 B2
(45) Date of Patent: Feb. 13, 2024

(54) DATA PACKET PRIORITIZATION IN MULTIPLEXED SESSIONS

(71) Applicant: Cisco Technology, Inc., San Jose, CA (US)

(72) Inventors: Vincent Parla, North Hampton, NH (US); Andrew Zawadowskiy, Hollis, NH (US); Oleg Bessonov, Littleton, MA (US); Hendrikus G. P. Bosch, Netherlands (NL)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 17/357,461

(22) Filed: Jun. 24, 2021

(65) Prior Publication Data
US 2022/0417158 A1    Dec. 29, 2022

(51) Int. Cl.
*H04L 47/24* (2022.01)
(52) U.S. Cl.
CPC .................................... *H04L 47/24* (2013.01)
(58) Field of Classification Search
CPC ..... H04L 47/24; H04L 47/20; H04L 45/3065; H04L 45/302; H04L 47/2425; H04L 45/30
See application file for complete search history.

(56) References Cited

U.S. PATENT DOCUMENTS

| 2001/0053149 | A1 | 12/2001 | Mo et al. |
| 2006/0187942 | A1 | 8/2006 | Mizutani et al. |
| 2011/0246665 | A1 | 10/2011 | Vange et al. |
| 2012/0039337 | A1 | 2/2012 | Jackowski et al. |
| 2014/0219112 | A1 | 8/2014 | Kherani et al. |
| 2015/0334732 | A1 | 11/2015 | Caretti et al. |
| 2019/0044705 | A1 | 2/2019 | Deval et al. |
| 2020/0068428 | A1 | 2/2020 | Meylan et al. |
| 2022/0039127 | A1* | 2/2022 | Li ..................... H04W 72/1289 |
| 2022/0086850 | A1* | 3/2022 | Huang .................. H04W 72/10 |
| 2022/0086886 | A1* | 3/2022 | Hosseini ........... H04W 72/1268 |

OTHER PUBLICATIONS

PCT Search Report and Written Opinion dated Oct. 17, 2022 for PCT application No. PCT/US2022/04976, 16 pages.

* cited by examiner

*Primary Examiner* — Khaled M Kassim
*Assistant Examiner* — Najeeb Ansari
(74) *Attorney, Agent, or Firm* — Lee & Hayes, P.C.

(57) ABSTRACT

A method of defining priority of a number of data packets within a queue includes generating a policy. The policy defines a first multiplexed channel of a plurality of multiplexed channels. The first multiplexed channel having a first priority. The policy also defines a second multiplexed channel of the plurality of multiplexed channels. The second multiplexed channel having a second priority. The first priority is defined as being of a higher priority relative to the second priority. The method further includes receiving the number of data packets over the plurality of multiplexed channels associated with a session based at least in part on the policy.

15 Claims, 8 Drawing Sheets

DATA PACKET PRIORITIZATION IN MULTIPLEXED SESSIONS

TECHNICAL FIELD

The present disclosure relates generally to data packet transmissions. Specifically, the present disclosure relates to systems and methods for deciding the priority of a packet prior to performing a decryption and/or encryption process.

BACKGROUND

Computers networks may be used to transmit data from one computing device to another for a myriad of reasons. Head-of-line (HOL) blocking in computer networking is a performance-limiting phenomenon that occurs when a line of packets form a queue and is held up by a first packet in the que. HOL blocking may occur, for example, in input-buffered network switches where out-of-order delivery of packets may occur and may occur when multiple requests are transmitted in hypertext transfer protocol (HTTP) pipelining. Further, other than reordering, HOL blocking, in terms of prioritization, may be caused by a large number of low priority packets being ahead of the high priority packets within the same queue. Such a switch may be composed of input buffered ports, output buffered ports, and switch fabric. When first-in first-out input buffers are used, only the first received packet is prepared to be forwarded. All packets received afterwards are not forwarded if the first one cannot be forwarded resulting in an HOL blocking situation.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
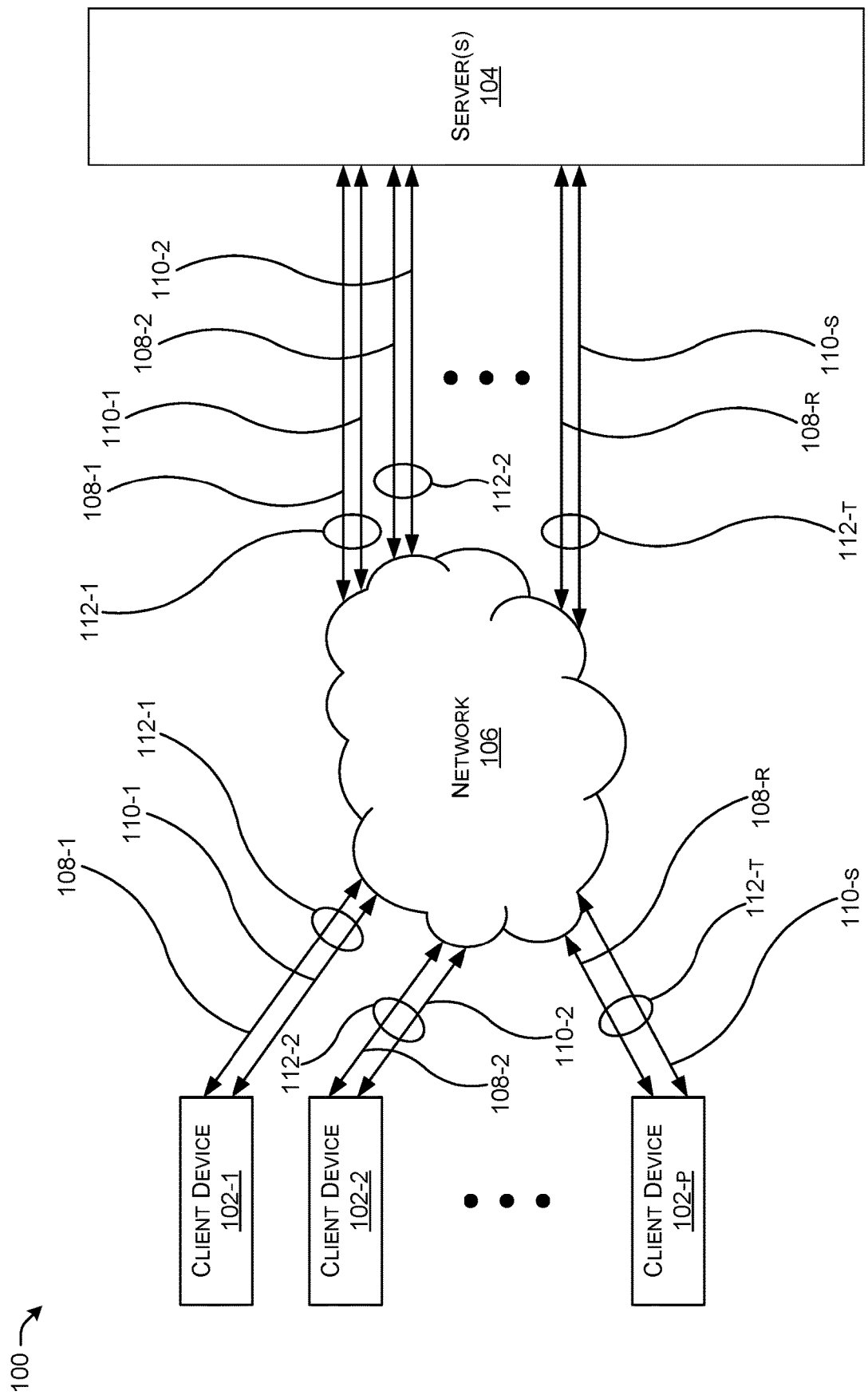
FIG. 1 illustrates a system-architecture diagram of a network that utilizes a number of cryptographic channels including a number of high-priority channels and low-priority channels, according to an example of the principles described herein.

HOL blocking in computer networking may limit the performance of network of computing devices. Any system that incorporates and utilizes a queue limits performance, and the mixing of data packets having different priorities in a single queue results in HOL blocking. If there is no HOL blocking occurring, data packets that have arrived have the chance to be forwarded around a stuck data packet processing data packets out of order. A number of different mechanisms may be employed to reorder packets. Protocols that multiplex data into a single encrypted channel or tunnel may include, for example, the QUIC general-purpose transport layer network protocol (e.g., HTTP/2 and/or HTTP/3), datagram transport layer security (DTLS) communications protocol, virtual private network (VPN) protocols, Internet protocol security (IPsec) VPN protocols, and protocols associated with software-defined networking (SDN) in a wide area network (WAN) (SD-WAN) such as, for example, an SD-WAN service VPN. These protocols are capable of addressing HOL blocking in terms of cryptography (e.g., encrypting and/or decrypting). These protocols may decrypt received data packets and/or payloads out of order. This offers significant benefits over transport layer security (TLS)-based protocols such as HTTPs and secure sockets layer (SSL)/TLS VPNs. Further, HOL blocking of higher priority packets may be a result of multiplexing multiple data flows of differing priorities, and, as a result, lower priority data packets may be processed ahead of high priority data packets.

However, none of the above protocols completely solve the problem of HOL blocking in terms of the rest of the payload and/or packet processing path since the protocols are required to perform a decryption operation first. In other words, the protocols suffer from the problem of having to first decrypt the packet to inspect internal fields of the packet in order to, in turn, determine if the packet contains data that is of high priority or low priority in nature. While packet level schemes such as quality of service (QoS) markings may be employed, the QoS-markings may not be honored end-to-end within a network and may often drop during transmission and processing of a data packet. The decrypt-first problem results in wasted central processing unit (CPU) cycles in terms of making a traffic priority decision that becomes critically important when trying to schedule and orchestrate cloud workloads that will need to decrypt and route traffic with different prioritizations, such as network traffic related to a videoconferencing instance or session versus network traffic related to web browsing. Further, in instances of end-to-end encryption, decryption is not possible.

Overview

In the examples described herein, methods, systems, and computer program products provide for deciding the priority of a packet prior to performing a decryption and/or encryption process. The methods, systems, and computer program products utilize one or more low-priority and high-priority encrypted channels or tunnels associated with each logical VPN or HTTP/2 or HTTP/3 (e.g., QUIC or multiplexed application substrate over QUIC encryption (MASQUE) session.

Examples described herein provide a non-transitory computer-readable medium storing instructions that, when executed, causes a processor to perform operations. The operations include receiving, from a plurality of client devices, a number of data packets over a plurality of multiplexed channels associated with a session. The plurality of multiplexed channels include a first multiplexed channel having a first priority, and a second multiplexed channel having a second priority. The first multiplexed channel is designated as having a higher priority relative to the second multiplexed channel. The operations further include processing the number of data packets transmitted via the first multiplexed channel prior to processing the number of data packets transmitted via the second multiplexed channel based at least in part on a policy.

In one example, the policy defines m-number of high-priority packets transmitted via the first multiplexed channel are to be processed before n-number of low-priority packets transmitted via the second multiplexed channel. In one example, the policy defines m-number of bytes of high-priority packets transmitted via the first multiplexed channel are to be processed before n-number of bytes of low-priority packets transmitted via the second multiplexed channel. In one example, the session may include a plurality of sessions, and the policy may define prioritization of a first session of the plurality of sessions over a second session of the plurality of sessions.

The operations further include performing a cryptographic process based on the policy. The cryptographic process may include decrypting the number of data packets, decapsulation, forwarding, and combinations thereof.

The operations further include adding the number of data packets transmitted over the plurality of multiplexed channels to a queue and processing the number of data packets within the queue based at least in part on the policy.

Examples described herein also provide a system including a processor, and a non-transitory computer-readable media storing instructions that, when executed by the processor, causes the processor to perform operations. The operations include generating a policy. The policy defines a first multiplexed channel of a plurality of multiplexed channels. The first multiplexed channel includes a first priority. The policy also defines a second multiplexed channel of the plurality of multiplexed channels. The second multiplexed channel includes a second priority. The first priority is defined as being of a higher priority relative to the second priority. The operations further include receiving a number of data packets over the plurality of multiplexed channels associated with a session, and processing the number of data packets transmitted via the first multiplexed channel prior to processing the number of data packets transmitted via the second multiplexed channel based at least in part on the policy.

The number of data packets are routed on the first multiplexed channel and the second multiplexed channel based on at least the policy. The operations further comprising performing a cryptographic process based on the policy. The cryptographic process includes encrypting the number of the data packets, decrypting the number of the data packets, decapsulation, forwarding, and combinations thereof.

The operations further include adding the number of data packets transmitted over the plurality of multiplexed channels to a queue and processing the number of data packets within the queue based at least in part on the policy. The policy defines m-number of high-priority packets transmitted via the first multiplexed channel are to be processed before n-number of low-priority packets transmitted via the second multiplexed channel. The policy defines m-number of bytes of high-priority packets transmitted via the first multiplexed channel are to be processed before n-number of bytes of low-priority packets transmitted via the second multiplexed channel. The session includes a plurality of sessions, and the policy defines prioritization of a first session of the plurality of sessions over a second session of the plurality of sessions. The first session is associated with a live session where data is transmitted in real time, and the second session is associated with a non-live session where data is transmitted at non-real time instances.

Examples described herein also provide a method of defining priority of a number of data packets within a queue. The method includes generating a policy. The policy defines a first multiplexed channel of a plurality of multiplexed channels. The first multiplexed channel has a first priority. The policy also defines a second multiplexed channel of the plurality of multiplexed channels. The second multiplexed channel has a second priority. The first priority is defined as being of a higher priority relative to the second priority. The method further includes receiving the number of data packets over the plurality of multiplexed channels associated with a session based at least in part on the policy.

The method further includes processing the number of data packets transmitted via the first multiplexed channel prior to processing the number of data packets transmitted via the second multiplexed channel based at least in part on the policy. The method further includes routing the number of data packets on the first multiplexed channel and the second multiplexed channel based on at least the policy.

The method further includes performing a cryptographic process based on the policy. The cryptographic process includes encrypting the number of the data packets, decrypting the number of the data packets, decapsulation, forwarding, and combinations thereof. The method further includes adding the number of data packets transmitted over the plurality of multiplexed channels to the queue and processing the number of data packets within the queue based at least in part on the policy. The session includes a plurality of sessions. The policy defines prioritization of a first session of the plurality of sessions over a second session of the plurality of sessions. The first session is associated with a live session where data is transmitted in real time, and the second session is associated with a non-live session where data is transmitted at non-real time instances.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

In conventional systems, cryptographic processing including encryption and decryption of data packets and/or their payloads may be performed during data transmission operations. However, cryptographic processing is, relatively speaking, computationally expensive in that cryptographic processing utilizes central processing unit (CPU) bandwidth. This utilization of the CPU bandwidth for cryptographic processing may exacerbate the above-described HOL blocking due to its computational expense. These encrypt/decrypt-first issues may be further amplified on a server computing device since the server computing device will receive a plurality of sessions (e.g., N number of sessions where N is any integer greater than or equal to 2) with mixed traffic types in terms of priority or importance (e.g., low-priority traffic and high-priority traffic), multiplexed into a single encrypted channel (e.g., a tunnel including encapsulated protocol data units (PDUs)). For example, a server computing device may be required to decrypt a data packet from N-HTTP/2 sessions using M-CPU-cores (where M is any integer greater than or equal to 1) only to learn that the internal data of the data packet is of lower priority than an HTTP/2 packet of another session that is in the queue to be cryptographically processed by the same M-CPU cores. It is noted that M-CPU cores are generally orders of magnitude smaller than N-HTTP/2 sessions. Stated another way, CPU cores may have service rates that may be smaller than arrival rates of data packets in some instances, and, as a result, queues form. Other channel(s) or data stream(s) may be required to be de-prioritized and delayed. As noted above, these relatively higher priority channel(s) or data stream(s) may be real-time traffic such as videoconferencing instances or sessions.

As alluded to above, multiplexing in computer networking is the process by which multiple signals are combined into one signal over a shared medium. An unintended outcome of the type of multiplexing that may be found in virtual private network (VPN) tunneling results in the same traffic shaping algorithm being applied to every flow. In other words, all prioritization is lost since no one session or instance is processed at a relatively higher priority than another. As noted above, cryptography may be the most computationally expensive operation even when accelerated via the CPU, so encryption/decryption of a data packet and/or its payload to determine if the traffic in question is of lower priority than another session is sub-optimal due to the delay in processing of the packets. This is true even in cases where there is a one-to-one mapping between an encrypted channel or tunnel and a destination where multiplexing does not occur. The present systems and methods decrypt and/or encrypt data packets, but does so for high priority data packets ahead of low priority data packets. This allows forwarding of data packets in accordance with the defined policies.

This problem manifests itself in real-world scenarios such as VPN termination at a server where many different types of traffic are multiplexed into a single, encrypted VPN channel associated with that VPN session. For example, X-VPN sessions (where X is any integer greater than or equal to 2) may be multiplexed with Outlook email application developed and distributed by Microsoft Corporation and WebEx videoconferencing application developed and distributed by Cisco Systems, Inc. based on a 'tunnel-all' traffic policy. With a large number of concurrent sessions that each include this multiplexed example of Outlook and Webex, the issue is magnified on the server computing device end. In a generic compute environment, shared CPU cores may also be used to perform the rest of the processing including, for example, decapsulation and forwarding, among other types of data processing.

Further, in a worst-case scenario, an HTTP/2 stream may be multiplexed over another HTTP/2/3 stream or a VPN tunnel. In fact, this scenario may not be uncommon in a secure internet gateway (SIG) implementation, wherein the outer stream which multiplexes multiple HTTP/2 streams of different priorities also impacts the inner multiplexed stream in terms of prioritization and time delays.

In light of the above, the present systems and methods provide a solution where priority and non-priority traffic may be sent in independent cryptographic channels or tunnels for QUIC (HTTP/2), DTLS VPNs, IPsec VPNs or SD-WAN Service VPNs, using the concept of a multiplexed priority channel (e.g., high-priority channel) and a multiplexed non-priority channel (e.g., low-priority channel) associated with each session.

Turning now to the figures, FIG. 1 illustrates a system-architecture diagram 100 of a network 106 that utilizes a number of cryptographic channels including a number of high-priority (HP) channels and low-priority (LP) channels, according to an example of the principles described herein. The HP channels and LP channels described herein are logical channels meaning that both the HP channels and the LP channels may be transmitted together over the same network connection or over separate network connections. In one example, a single network connection may be provided for both a HP channel and a LP channel meaning that both the HP channel and the LP channel may be transmitted over the same network connection. In contrast, in one example, two independent network connection may be provided for a HP channel and a LP channel, respectively. In the examples described herein, an unencrypted generic routing encapsulation (GRE), generic user datagram protocol (UDP) encapsulation (GUE), generic network virtualization encapsulation (GENEVE), or other encapsulation header may be included within each data packet to indicate what channel the data packet is associated with. The tuples of the data packets may be the same for both high and low priority channels.

The system-architecture diagram 100 of FIG. 1 may include a number of client devices 102-1, 102-2, 102-P where P is any integer greater than or equal to 1 (collectively referred to as "client device(s) 102"). As used herein and in the appended claims, the term "high-priority (HP) channel" or similar language may be defined broadly as any channel within a multiplexed signal that has a relatively greater priority over a number of other channels. Similarly, as used herein and in the appended claims, the term "low-priority (LP) channel" or similar language may be defined broadly as any channel within a multiplexed signal that has relatively less priority over a number of other channels. Stated another way, a HP channel may be a priority channel where priority data packets are transmitted, and an LP channel may be a non-priority channel where non-priority data packets are transmitted. Although two different multiplexed channels with relatively different priorities are described herein, the multiplexed channel may include any number of channels with different priority levels. Further, in one example, each multiplexed channel may include a plurality of HP channels and/or LP channels. Increasing the number of HP channels, LP channels, and/or intermediate priority channels may be based on a number of factors including, for example, processing resources within the client devices 102 and/or the server(s) 104 (e.g., a number of central processing unit (CPU) cores available for processing of data), algorithmic constraints, other factors, and a combination thereof.

The client devices 102 may be communicatively coupled to a number of server(s) 104 via a network 106. The network 106 may include any number of intermediary or intervening computing device capable of transmitting data between the client devices 102 and the server(s) 104 including, for example, relays, repeaters, routers, switches, encoder/receiver/transmitters (ERTs), appliances, personal computers (e.g., desktop computers, laptop computers, etc.), mobile devices (e.g., smartphones, tablets, personal digital assistants (PDAs), electronic reader devices, etc.), wearable computers (e.g., smart watches, optical head-mounted displays (OHMDs), etc.), servers, and access points, and gateway computing devices, among others.

Further, although the client devices 102 are described herein as endpoints communicating with a number of server(s) 104, the client devices 102 may take the form of any computing device capable of transmitting data packets to the server(s) 104. As made evident in the description provided herein, the server(s) 104 are described as the computing device(s) that receive data packets from a plurality of computing devices (e.g., the client devices 102) and the server(s) 104 is/are tasked with processing the data packets based on the priority (e.g., high-priority and low-priority) of the data packets within a queue. Further, both the client devices 102 and the server(s) 104 are described herein as being capable of processing high-priority data packets and low-priority data packets with a queue. However, because the server(s) 104 receive data packets from a number of sources (e.g., the client devices 102) but each individual client device 102 receives data packets from a single source (e.g., the server(s) 104), the utility and economy of the present systems and methods may be best understood from the perspective of the server(s) 104 and its/theirs ability to process the data packets. In one example, the client devices 102 may be any device described herein including, for example, another server device. It is noted that the client devices 102 will also benefit by properly handling different priority flows as described herein, and especially on connections with high latency between the client devices 102 and a terminating server device.

The server(s) 104 may include any number of computing devices that may be used to process data transmitted from the client devices 102. The server(s) 104 may include any combination of computer hardware and software that provides for the functionality described herein including, for example, generating policies, routing data packets on a plurality of separate channels, adding data packets to a queue, processing data packets within the queue based on the policies, and/or performing cryptographic processes based on the policies. The server(s) 104 may provide various functionalities and services including, for example, sharing data and computing resources among the client devices 102, and/or performing computations for the client devices 102.

In one example, the server(s) 104 may include a virtual private network (VPN) device that acts as an intermediary device that, in turn, forwards data packets to a destination device (not shown). In this example, the server(s) 104 may process data packets according to the methods described herein.

The client devices 102 may each utilized a plurality of the server(s) 104. The server(s) 104 may include web servers, media servers, database servers, file servers, mail servers, print servers, web servers, game servers, virtual servers, proxy servers (e.g., a QUIC proxy server), computing servers, communication servers, application servers, a number of privately-hosted servers, a number of enterprise-hosted servers, and a cloud network of servers, among a myriad of other types of server(s) 104 and their associated functionalities and services. In one example, the functionality and services of the server(s) 104 may be provided as a cloud computing-based network infrastructure and service. In this example, the server(s) 104 may be offered as on-demand computer system resources such as data storage, DNS services, and/or computing power, without direct active management by the user of the client devices 102 and/or an administrator. In one example, the cloud-based server(s) 104 may include a private or enterprise cloud provided to an organization such as the administrator's organization, and/or may include a public cloud. In one example, the functionality and services of the server(s) 104 may provide email services, videoconferencing services, streaming services, content filtering services, secure web gateway services, firewall services, data processing services, and data storage services, among other services. Further, the functionality described herein may occur as an on-demand availability of computer system resources (e.g., communications platform as a service (CPaaS), content as a service (CaaS), infrastructure as a service (IaaS), hardware as a service (HaaS), Internet of Things as a Service (IoTaaS), load balancing as a service (LBaaS), media processing as a service (MPaaS), network as a service (NaaS), platform as a service (PaaS), function as a service (FaaS), software as a service (SaaS), anything as a service (XaaS), among others) including data storage (cloud storage) and computing power.

The client devices 102 may communicate with the server(s) 104 to transmit a number of data packets between the client devices 102 and the server(s) 104. The data packets may represent data of differing priorities based on a number of policies defined by the client devices 102 and/or the server(s) 104. Further, in one example, the priorities described herein may also be defined based on the type of application(s) executed on the client devices 102 and/or the server(s) 104 and the network bandwidth requires of those application(s). In the examples described herein, the client devices 102 and the server(s) 104 may utilize a plurality of multiplexed channels and, a priori, determine which data packets are to be transmitted via a number of HP channels and which data packets are to be transmitted via a number of LP channels before any cryptographic processing is performed in connection with the data packets within a numbers of queues.

Thus, as depicted in FIG. 1, data packets may be multiplexed via a number of HP channels 108-1, 108-2, 108-R, where R is any integer greater than or equal to 1 (collectively referred to as "HP channel(s) 108") and a number of LP channels 110-1, 110-2, 110-S, where S is any integer greater than or equal to 1 (collectively referred to as "LP channel(s) 110"). Multiple HP channels 108 and multiple LP channels 110 may exist, but the examples herein utilize a single HP channel 108 and a single LP channel 110. In one example, the number of HP channels 108 and LP channels 110 may be greater than one. Further, in on example, the number of HP channels 108 and LP channels 110 may be different.

The HP channels 108 and LP channels 110 may be part of a pair of channels that form a multiplexed communication channel 112-1, 112-2, 112-T, where T is any integer greater than or equal to 1 (collectively referred to as "multiplexed communication channels 112"). The multiplexed communication channels 112 may carry respective HP channels 108 and LP channels 110 over the same signal and/or over the same medium (e.g., physical communication line). Thus, the HP channels 108 and LP channels 110 are multiplexed over their respective multiplexed communication channel 112.

In one example, data packets transmitted between the client devices 102 and the servers 104 may be assigned to the HP channels 108 or the LP channels 110 based on a number of policies that define which data packets are to be given HP or LP. Further, in one example, the data packets may be labeled or identified as HP or LP based on, for example, identifiers included within the data packets. In one example, the data packets may include a HP or LP identification in the form of a type of service (ToS) byte that may be included as a second byte within a header (e.g., an IPv4 header) of the data packet, a number of QoS markings or identifiers associated with or identified within the data packets, and other data packet tagging or identifying methods.

Further, the policies used to define whether a data packet is transmitted over a HP channel 108 or a LP channel 110 of a multiplexed communication channel 112 may be created by an administrator of the client devices 102, the server(s) 104, the overall system depicted in the system-architecture diagram 100 and combinations thereof. The policies may be distributed to the client devices 102 and the server(s) 104 in order to allow these devices to function according to the processes described herein and the policies created.

Further, prioritization of data packets between the HP channels 108 and LP channels 110 may be based on any number of preferences, policies, service-level agreements (SLAs), etc. For example, the prioritization of data packets between the HP channels 108 and LP channels 110 may include ensuring that all HP data packets transmitted over the HP channel 108 and within a queue of the device (e.g., the client device 102 or the server(s) 104) are processed and x-number of LP data packets are processed within a given time frame. Further priority may be given to data packets associated with, for example, real-time communications such as, for example, a videoconferencing instance (e.g., Webex teleconferencing system developed and distributed by Cisco Systems, Inc.) where these data packets may be assigned high priority within the policy or policies while data packets associated with a media streaming service (e.g., Netflix media streaming services developed and distributed by Netflix, Inc.), email services (e.g., Outlook email application developed and distributed by Microsoft Corporation), and web traffic (e.g., web downloads) may be assigned low priority. In these examples, data packets associated with real-time communications may be transmitted via the HP channels 108 and data packets associated with the media streaming (e.g., Netflix), email services (e.g., Microsoft Outlook mail server), or web traffic (e.g., web downloads) may be transmitted via the LP channels 110.

In one example, the policy or policies utilized by the client devices 102 and/or the server(s) 104 may be defined based on differing numbers of HP data packets and LP data packets such that B-number of HP packets (e.g., where B=10) within a queue are processed before C-number of LP packets (e.g., where C=1) with the queue are processed. In this manner, the HP data packets are processed with their due priority, but the LP data packets are still processed at some point.

Further, in one example, the policy or policies utilized by the client devices 102 and/or the server(s) 104 may be defined by number of bytes allocated for HP data packets and LP data packets. In this example, the interface at the server may include a gigabit interface capable of processing a gigabit of data within a given time period (e.g., every second). The policy may define that 100 megabits (MBs) (e.g., 100 Mbps) within that time period may be utilized for LP data packets within the queue with the remaining 900 MBs (e.g., 900 Mbps) within that time period are to be utilized for HP data packet processing. This leads to essentially 90% of network bandwidth being utilized for HP data packets received into the queue via the HP channel 108 and 10% being utilized for LP data packets received into the queue via the LP channel 110.

Still further, the policy or policies may also include prioritization of a session of one client device 102 over the session of another client device 102 for any number of reasons. For example, client device 102-1 may be utilized by an administrator who is given priority over all other client devices 102 within the system. In this example, data packets sent by client device 102-1 over, for example, the HP channel 108, may be queued in a common queue utilized by the server(s) 104 when receiving transmission from a plurality of the client devices 102.

Even still further, in one example, the client devices 102 and/or the server(s) 104 may include processing resources sufficient to process all HP data packets received via the HP channel 108 and all the LP data packets received via the LP channel 110. In this example, the queue may be effectively zero (0) where the devices (e.g., the client devices 102 and the server(s) 104) within the system are able to process the data packets within the queue without dropping any packets. The policies used to prioritize the data packets in this example may not be triggered since all data packets are being timely processed. However, in this example, a relatively larger number of data packets may be transmitted via the HP channel 108 and the LP channel 110 based on the prioritization described herein such that the data packets are queued in the queue. When a relatively larger number of data packets may be transmitted via the HP channel 108 and the LP channel 110 and are queued or queue, the policies used to prioritize the data packets may then be triggered and cause the HP data packets received via the HP channel 108 and queued within the queue to be given processing priority over the LP data packets received via the LP channel 110 and queued within the queue.

Further, in one example, the client devices 102 and/or the server(s) 104 may not include processing resources sufficient to process all HP data packets received via the HP channel 108 and all the LP data packets received via the LP channel 110. Stated another way, the arrival rate of data packets into a queue of the client devices 102 and/or the server(s) 104 may exceed a computational processing rate of the client devices 102 and/or the server(s) 104. In this example, the policy or policies may require that all HP data packets transmitted via the HP channel 108 be processed, and any number of LP data packets transmitted via the LP channel 110 to (1) wait in the queue until all HP data packets are processed; (2) starve out all processing resources of the receiving computing device (e.g., the client devices 102 or the server(s) 104) to process the HP data packets and leaving no processing resources available to process the LP data packets; and/or (3) be allowed to drop (e.g., when the LP queue is full because it is started for processing for a predetermined period of time). In this manner, the policy or policies utilized by the client devices 102 and/or the server(s) 104 may always ensure that the HP data packets transmitted via the HP channel 108 are processed irrespective of how many LP data packets are transmitted.

In one example, the policies implemented by the server(s) 104 may be different from the policies implemented by any number of the client devices 102. However, in the examples described herein, the policies implemented by the client devices 102 and the server(s) 104 may cause at least the HP channels 108 used to transmit HP data packets to have priority over the LP channels 110 used to transmit LP data packets.

Figure 2:
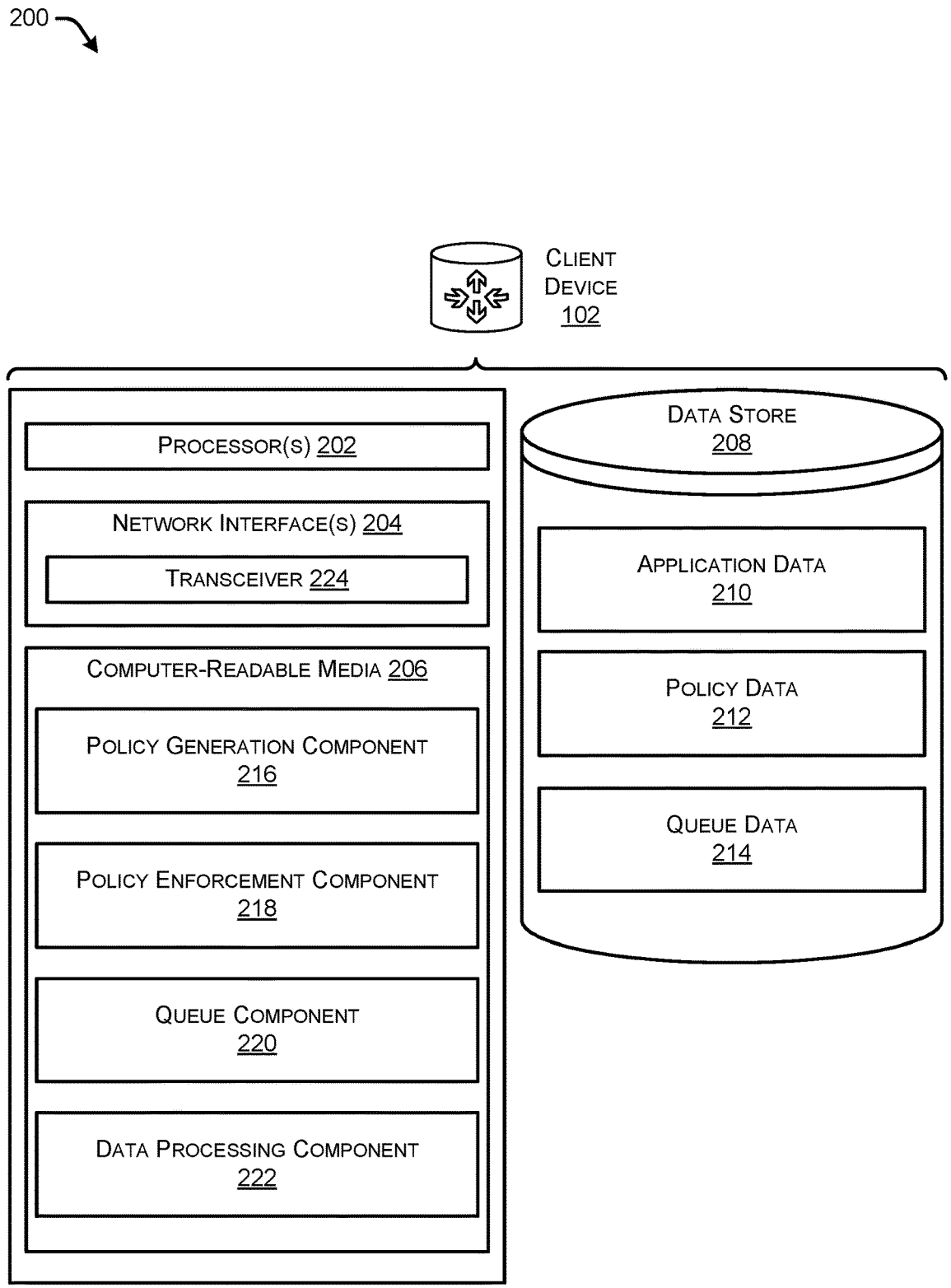
FIG. 2 illustrates a component diagram of example components of a client device, according to an example of the principles described herein.

More details regarding the manner in which data packets transmitted between the client devices 102 and the server(s) 104 are prioritized will now be described in connection with FIGS. 2 and 3. FIG. 2 illustrates a component diagram 200 of example components of a client device 102, according to an example of the principles described herein. As illustrated, the client device 102 may include one or more hardware processor(s) 202 configured to execute one or more stored instructions. The processor(s) 202 may comprise one or more cores. The processor(s) 202 may define a level of computational power or processing resource available to the client device 102 for processing of the HP data packets transmitted to the client device 102 via the HP channel 108 and the LP data packets transmitted to the client device 102 via the LP channel 110. As noted above, because a client device 102 may receive the data packets from a single source such as the server(s) 104, the number of processor(s) 202 included within the client device 102 (and consequently the amount of processing power) may be relatively lower than the number of processor(s) included in and utilized by the sever(s) 104. However, the number of processor(s) and/or processing power provisioned within the client devices 102 may be sufficient to process data packets according to the methods described herein. It is noted that is all client network connections go over a VPN, then the client device 102 may become very busy sending data packets such as, for example, when streaming audio/video content and performing other processing tasks.

Further, the client device 102 may include one or more network interfaces 204 configured to provide communications between the client device 102 and other devices, such as devices associated with the system architecture of FIG. 1 including the network 106, the server(s) 104, and/or other systems or devices associated with the client device 102 and/or remote from the client device 102. The network interfaces 204 may include devices configured to couple to personal area networks (PANs), wired and wireless local area networks (LANs), wired and wireless wide area networks (WANs), and so forth. For example, the network interfaces 204 may include devices compatible with the client devices 102, the network 106, the server(s) and/or other systems or devices associated with the client device 102. Compatibility in this example provides for access to a network such that the client device 102 may, in turn, access the server(s) 104, but may not be relevant to the server(s) 104 and/or the network 106.

The client device 102 may also include computer-readable media 206 that stores various executable components (e.g., software-based components, firmware-based components, etc.). In one example, the computer-readable media 206 may include, for example, working memory, random access memory (RAM), read only memory (ROM), and other forms of persistent, non-persistent, volatile, non-volatile, and other types of data storage. In addition to various components discussed herein, the computer-readable media 206 may further store components to implement functionality described herein. While not illustrated, the computer-readable media 206 may store one or more operating systems utilized to control the operation of the one or more devices that comprise the client device 102. According to one example, the operating system comprises the LINUX operating system. According to another example, the operating system(s) comprise the WINDOWS SERVER operating system from MICROSOFT Corporation of Redmond, Washington According to further examples, the operating system(s) may comprise the UNIX operating system or one of its variants. It may be appreciated that other operating systems may also be utilized.

Additionally, the client device 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems. The data store 208 may store, for example, application data 210 defining computer-executable code utilized by the processor 202 to execute the components stored within the computer-readable media 206. Further, the application data 210 may include data relating to user preferences associated with the components, passwords, usernames, and other data that may be used by the components to sign on to services provided by the server(s) 104, and any other data related to the execution of the components.

Further, the data store 208 may store policy data 212. The policy data 212 may include any data obtained and/or created by the client device 102 regarding the policies utilized to process data packets transmitted to and from the client device 102 over the HP channel 108 and the LP channel 110. The policy data 212 may include, for example, data defining parameters by which HP data packets sent via the HP channel 108 are prioritized above LP data packets sent via the LP channel 110. The policy data 212 may further include, for example, data defining what types of data packets are to be transmitted via the HP channel 108 and/or what types of data packets are to be transmitted via the LP channel 110. The policy data 212 may further include other data described herein that may be utilized to assign data packets to the HP channel 108 or the LP channel 110, transmit the data packets via the HP channel 108 and the LP channel 110, queue the data packets, process the data packets based on the policies, and perform other policy related processes as described herein.

The data store 208 may further store queue data 214. A queue is any combination of hardware (e.g., memory and/or processor) and software that collects data packets and maintains the data packets in a sequence. The queue component 220 described herein is an example of a queue. The queue may act such that each queued element (e.g., data packet) additionally has a priority associated therewith. An element with high priority such as those data packets sent via a HP channel 108 is served before an element with low priority such as those data packets sent via a LP channel 110. In one example, if two elements have the same priority such as two separate HP data packets sent via the HP channel 108 or two separate LP data packets sent via the LP channel 110, they are served according to the order in which they were enqueued.

The computer-readable media 206 may store portions, or components, of services related to the prioritization of data packets transmitted between the client device 102 and the server(s) 104 via the HP channels 108 and the LP channels 110. For example, the prioritization services of the computer-readable media 206 may include a policy generation component 216 to, when executed by the processor(s) 202, generate or obtain a number of policies for use in determining how data packets are to be subjected to prioritization during transmission. The policy generation component 216 may provide for a user, via a user interface or other method, to create and store a number of policies as policy data 212 within the data store 208. Further, the policy generation component 216 may provide for a user to request or import a number of policies as policy data 212 within the data store 208 from another source or computing device such as, for example, an administrator's computing device, the server(s) 104, and other sources. The policy generation component 216 may include all or a portion of the executable code associated with the HP channels 108 and LP channels 110 and may be executed to bring about the functionality of the HP channels 108 and LP channels 110 and their use in prioritizing data packets a priori to other data processing such as cryptographic processing, decapsulation, and data packet forwarding processing, and other data processing steps.

The computer-readable media 206 may also include a policy enforcement component 218. The policy enforcement component 218, when executed by the processor(s) 202, may cause a number of policies stored as policy data 212 within the data store 208 to be enforced and cause a number of data packets to be allocated to and transmitted by the HP channels 108 and LP channels 110 according to the techniques described herein. In one example, the policy enforcement component 218 may assign data packets for transmission via the HP channels 108 or the LP channels 110 based on what application the data packets are sourced from and what the policies require of those data packets. For example, if the policy enforcement component 218 obtains data packets from a real-time communications application such as, for example, a videoconferencing instance (e.g., Webex teleconferencing system developed and distributed by Cisco Systems, Inc.) and the policy defines data packets for a real-time communications applications are to be sent via the HP channel 108, the policy enforcement component 218 will assign those data packets to be transmitted via the HP channel 108. In contrast, if the policy enforcement component 218 obtains data packets from a non-real-time communications application such as, for example, an email service or application (e.g., Outlook email application developed and distributed by Microsoft Corporation) and the policy defines data packets for a non-real-time communications applications are to be sent via the LP channel 110, the policy enforcement component 218 will assign those data packets to be transmitted via the LP channel 110.

In an example where two competing real-time traffic applications such as the above-mentioned videoconferencing instance (e.g., Webex teleconferencing system developed and distributed by Cisco Systems, Inc.) and a media streaming application (e.g., Netflix media streaming services developed and distributed by Netflix, Inc.), the policies may define what real-time traffic should be placed at HP and which should be placed at LP. In this example, an administrator may require that data packets associated with enterprise-related applications (e.g., Webex) be given priority over data packets associated with non-enterprise-related applications (e.g., Netflix), the Webex data packets will be transmitted via the HP channel 108 and the Netflix data packets will be transmitted via the LP channel 110.

Further, in one example, the policy enforcement component 218 may label or otherwise identify data packets as HP or LP using, for example, identifiers appended to or included within the data packets. In one example, the data packets may include a HP or LP identification in the form of a ToS byte that may be included as a second byte within a header (e.g., an IPv4 header) of the data packet, a number of QoS markings or identifiers associated with or identified within the data packets, and other data packet tagging or identifying methods.

The computer-readable media 206 may also include a queue component 220. The queue component 220, when executed by the processor(s) 202, may collect data packets transmitted to the client device 102 from, for example, the server(s) 104, and maintain the data packets in a sequence within the queue. The hardware components of the queue component 220 may include any data storage device or region of physical memory storage such as a data buffer, working memory, RAM, ROM, and other forms of persistent, non-persistent, volatile, non-volatile, and other types of data storage. In one example, the queue component 220 may include regions of physical memory to store HP data packets sent via the HP channel 108 of the multiplexed communication channel 112 and regions of physical memory to store LP data packets sent via the LP channel 110 of the multiplexed communication channel 112.

The computer-readable media 206 may also include a data processing component 222. The data processing component 222, when executed by the processor(s) 202, may process data within received data packets for any purpose for which the data packets were transmitted and for any additional application being executed by the processor(s) 202. For example, the data processing component 222 may be tasked with performing cryptographic processing (e.g., encryption and/or decryption) to encrypt data packets as the client device 102 sends the data packet to the server(s) 104 and/or decrypt the data packets as the client device 102 receives the data packet from the server(s) 104. In addition to performing cryptographic processing, other data processes performed by the data processing component 222 may include, for example, data packet forwarding in instances where the client device 102 is an intermediary device. In the examples described herein, the client devices 102 and the server(s) 104 may utilize the HP and LP multiplexed channels 108, 110 of the multiplexed communication channel 112 and, a priori (e.g., before any additional processing by the data processing component 222), determine which data packets are to be transmitted via a number of HP channels and which data packets are to be transmitted via a number of LP channels. Further, before any additional processing by the data processing component 222, the queue component 220 may be instructed to enqueue the data packets within the queue component 220 based on their priority identified by their transmission via the HP channel 108 and the LP channel 110.

The queue component 220 and the data processing component 222 may utilize a transceiver 224 to transmit data packets over the multiplexed communication channels 112 including the HP channels 108 and LP channels 110. Thus, the client device 102 may further include a transceiver 224. The transceiver 224 provides for communications with other data processing systems or devices such as, for example, the server(s) 104 and/or other computing devices communicatively coupled to the server(s) 104 and/or the client device 102. In one example, the transceiver 224 includes one or more network interface cards. The transceiver 224 may provide communications through the use of either or both physical and wireless communications links including the multiplexed communication channels 112.

The server(s) 104 may include similar elements as described above in connection with the client devices 102. However, since the server(s) 104 receive a plurality of signals from the plurality of client devices 102 via the multiplexed communication channels 112. Thus, the processing strain on the server(s) 104 may be relatively greater as compared to the client devices 102. Therefore, the utility of the present systems and methods may be more fully realized as to the server(s) 104.

Figure 3:
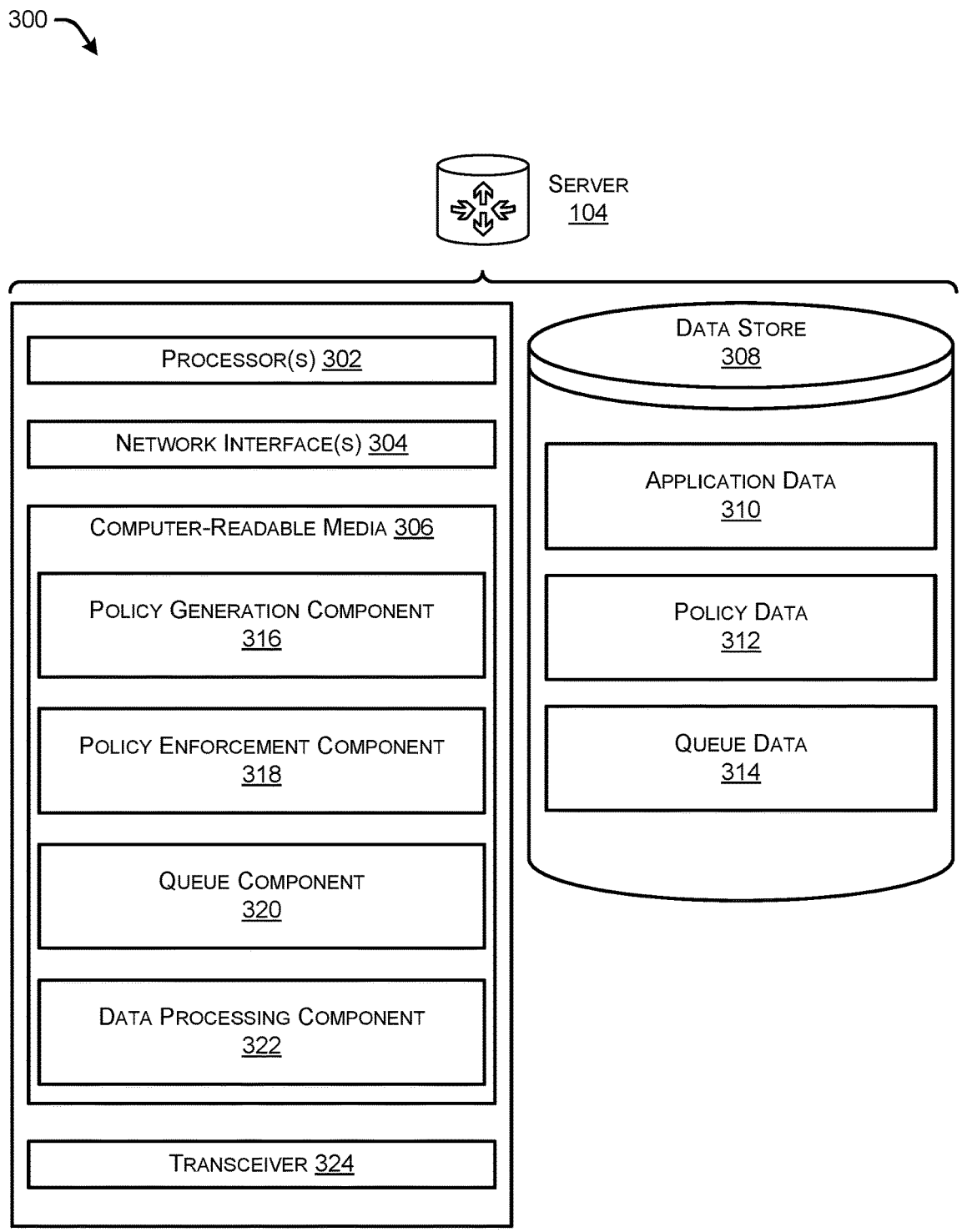
FIG. 3 illustrates a component diagram of example components of a server, according to an example of the principles described herein.

FIG. 3 illustrates a component diagram 300 of example components of a server, according to an example of the principles described herein. As illustrated in FIG. 3, the server(s) 104 may include one or more hardware processor(s) 302 configured to execute one or more stored instructions. The processor(s) 302 may comprise one or more cores. The processor(s) 302 may define a level of computational power or processing resource available to the server(s) 104 for processing of the HP data packets transmitted to the server(s) 104 via the HP channel 108 and the LP data packets transmitted to the server(s) 104 via the LP channel 110. As noted above, because a server(s) 104 may receive the data packets from a plurality of sources such as the plurality of client devices 102, the number of processor(s) 302 included within the server(s) 104 (and consequently the amount of processing power) may be relatively higher than the number of processor(s) included in and utilized by the client devices 102. However, the number of processor(s) and/or processing power provisioned within the client devices 102 may be sufficient to process data packets according to the methods described herein. In one example, the server(s) 104 may include M-CPU cores where M is any integer greater than or equal to 1 and the M-CPU cores may be, in one example, orders of magnitude smaller than number of data packets and/or sessions (e.g., N number of VPN, HTTP/2 (QUIC), and/or HTTP/3 (MASQUE) sessions).

Further, the server(s) 104 may include one or more network interfaces 304 configured to provide communications between the server(s) 104 and other devices, such as devices associated with the system architecture of FIG. 1 including the network 106, the client devices 102, and/or other systems or devices associated with the server(s) 104 and/or remote from the server(s) 104. The network interfaces 304 may include devices configured to couple to personal area networks (PANs), wired and wireless local area networks (LANs), wired and wireless wide area networks (WANs), and so forth. For example, the network interfaces 304 may include devices compatible with the client devices 102, the network 106, the server(s) 104 and/or other systems or devices associated with the server(s) 104.

The server(s) 104 may also include computer-readable media 306 that stores various executable components (e.g., software-based components, firmware-based components, etc.). In one example, the computer-readable media 306 may include, for example, working memory, random access memory (RAM), read only memory (ROM), and other forms of persistent, non-persistent, volatile, non-volatile, and other types of data storage. In addition to various components discussed herein, the computer-readable media 306 may further store components to implement functionality described herein. While not illustrated, the computer-readable media 306 may store one or more operating systems utilized to control the operation of the one or more devices that comprise the server(s) 104. According to one example, the operating system comprises the LINUX operating system. According to another example, the operating system(s) comprise the WINDOWS SERVER operating system from MICROSOFT Corporation of Redmond, Washington According to further examples, the operating system(s) may comprise the UNIX operating system or one of its variants. It may be appreciated that other operating systems may also be utilized.

Additionally, the server(s) 104, like the client devices 102, may include a data store 308 which may comprise one, or multiple, repositories or other storage locations for persistently storing and managing collections of data such as databases, simple files, binary, and/or any other data. The data store 308 may include one or more storage locations that may be managed by one or more database management systems. The data store 308 may store, for example, application data 310 defining computer-executable code utilized by the processor 302 to execute the components stored within the computer-readable media 306. Further, the application data 310 may include data relating to user preferences associated with the components, passwords, usernames, and other data that may be used by the components to sign on to services provided by the server(s) 104, and any other data related to the execution of the components.

Further, the data store 308 may store policy data 312. The policy data 312 may include any data obtained and/or created by the server(s) 104 regarding the policies utilized to process data packets transmitted to and from the server(s) 104 over the HP channel 108 and the LP channel 110. The policy data 312 may include, for example, data defining parameters by which HP data packets sent via the HP channel 108 are prioritized above LP data packets sent via the LP channel 110. The policy data 312 may further include, for example, data defining what types of data packets are to be transmitted via the HP channel 108 and/or what types of data packets are to be transmitted via the LP channel 110. The policy data 312 may further include other data described herein that may be utilized to assign data packets to the HP channel 108 or the LP channel 110, transmit the data packets via the HP channel 108 and the LP channel 110, queue the data packets, process the data packets based on the policies, and perform other policy related processes as described herein.

The data store 308 may further store queue data 314. As described above, a queue is any combination of hardware (e.g., memory and/or processor) and software that collects data packets and maintains the data packets in a sequence. The queue component 320 described herein is an example of a queue. The queue may act such that each queued element (e.g., data packet) additionally has a priority associated therewith. An element with high priority such as those data packets sent via a HP channel 108 is served before an element with low priority such as those data packets sent via a LP channel 110. In one example, if two elements have the same priority such as two separate HP data packets sent via the HP channel 108 or two separate LP data packets sent via the LP channel 110, they are served according to the order in which they were enqueued. In one example, the size of the queue of the server(s) 104 and, in turn, the amount within the data store 308 allocated for the queue data 314 may be relatively larger with respect to the corresponding elements within the client devices 102.

The computer-readable media 306 may store portions, or components, of services related to the prioritization of data packets transmitted between the server(s) 104 and the client devices 102 via the HP channels 108 and the LP channels 110. For example, the prioritization services of the computer-readable media 306 may include a policy generation component 316 to, when executed by the processor(s) 302, generate or obtain a number of policies for use in determining how data packets are to be subjected to prioritization during transmission. The policy generation component 316 may provide for a user, via a user interface or other method, to create and store a number of policies as policy data 312 within the data store 308. Further, the policy generation component 316 may provide for a user to request or import a number of policies as policy data 312 within the data store 308 from another source or computing device such as, for example, an administrator's computing device, the client devices 102, and other sources. The policy generation component 316 may include all or a portion of the executable code associated with the HP channels 108 and LP channels 110 and may be executed to bring about the functionality of the HP channels 108 and LP channels 110 and their use in prioritizing data packets a priori to other data processing such as cryptographic processing, data packet forwarding processing, and other data processing steps.

The computer-readable media 306 may also include a policy enforcement component 318. The policy enforcement component 318, when executed by the processor(s) 302, may cause a number of policies stored as policy data 312 within the data store 308 to be enforced and cause a number of data packets to be allocated to and transmitted by the HP channels 108 and LP channels 110 according to the techniques described herein. In one example, the policy enforcement component 318 may assign data packets for transmission via the HP channels 108 or the LP channels 110 based on what application the data packets are sourced from and what the policies require of those data packets. For example, if the policy enforcement component 318 obtains data packets from a real-time communications application such as, for example, a videoconferencing instance (e.g., Webex teleconferencing system developed and distributed by Cisco Systems, Inc.) and the policy defines data packets for a real-time communications applications are to be sent via the HP channel 108, the policy enforcement component 318 will assign those data packets to be transmitted via the HP channel 108. In contrast, if the policy enforcement component 318 obtains data packets from a non-real-tie communications application such as, for example, an email service or application (e.g., Outlook email application developed and distributed by Microsoft Corporation) and the policy defines data packets for a non-real-time communications applications are to be sent via the LP channel 110, the policy enforcement component 318 will assign those data packets to be transmitted via the LP channel 110.

In an example where two competing real-time traffic applications such as the above-mentioned videoconferencing instance (e.g., Webex teleconferencing system developed and distributed by Cisco Systems, Inc.) and a media streaming application (e.g., Netflix media streaming services developed and distributed by Netflix, Inc.), the policies may define what real-time traffic should be placed at HP and which should be placed at LP. In this example, an administrator may require that data packets associated with enterprise-related applications (e.g., Webex) be given priority over data packets associated with non-enterprise-related applications (e.g., Netflix), the Webex data packets will be transmitted via the HP channel 108 and the Netflix data packets will be transmitted via the LP channel 110.

Further, in one example, the policy enforcement component 318 may label or otherwise identify data packets as HP or LP using, for example, identifiers appended to or included within the data packets. In one example, the data packets may include a HP or LP identification in the form of a ToS byte that may be included as a second byte within a header (e.g., an IPv4 header) of the data packet, a number of QoS markings or identifiers associated with or identified within the data packets, and other data packet tagging or identifying methods.

The computer-readable media 306 may also include a queue component 320. The queue component 320, when executed by the processor(s) 302, may collect data packets transmitted to the server(s) 104 from, for example, the client devices 102, and maintain the data packets in a sequence within the queue. The hardware components of the queue component 320 may include any data storage device or region of physical memory storage such as a data buffer, working memory, RAM, ROM, and other forms of persistent, non-persistent, volatile, non-volatile, and other types of data storage. In one example, the queue component 320 may include regions of physical memory to store HP data packets sent via the HP channel 108 of the multiplexed communication channel 112 and regions of physical memory to store LP data packets sent via the LP channel 110 of the multiplexed communication channel 112.

The computer-readable media 306 may also include a data processing component 322. The data processing component 322, when executed by the processor(s) 302, may process data within received data packets for any purpose for which the data packets were transmitted and for any additional application being executed by the processor(s) 302. For example, the data processing component 322 such as a CPU, a field programmable gate array (FPGA), an application specific integrated circuit (ASIC), and a graphics processing unit (GPU), among other data processing devices may be tasked with performing cryptographic processing (e.g., encryption and/or decryption) to encrypt data packets as the server(s) 104 sends the data packet to the client devices 102 and/or decrypt the data packets as the server(s) 104 receives the data packet from the client devices 102. In addition to performing cryptographic processing, other data processes performed by the data processing component 322 may include, for example, data packet forwarding in instances where the server(s) 104 is an intermediary device. In the examples described herein, the client devices 102 and the server(s) 104 may utilize the HP and LP multiplexed channels 108, 110 of the multiplexed communication channel 112 and, a priori (e.g., before any additional processing by the data processing component 322), determine which data packets are to be transmitted via a number of HP channels and which data packets are to be transmitted via a number of LP channels. Further, before any additional processing by the data processing component 322, the queue component 320 may be instructed to enqueue the data packets within the queue component 320 based on their priority identified by their transmission via the HP channel 108 and the LP channel 110.

The queue component 320 and the data processing component 322 may utilize a transceiver 324 to transmit data packets over the multiplexed communication channels 112 including the HP channels 108 and LP channels 110. Thus, the server(s) 104 may further include a transceiver 324. The transceiver 324 provides for communications with other data processing systems or devices such as, for example, the client devices 102 and/or other computing devices communicatively coupled to the server(s) 104 and/or the client devices 102. In one example, the transceiver 324 includes one or more network interface cards. The transceiver 324 may provide communications through the use of either or both physical and wireless communications links including the multiplexed communication channels 112.

Figure 4:
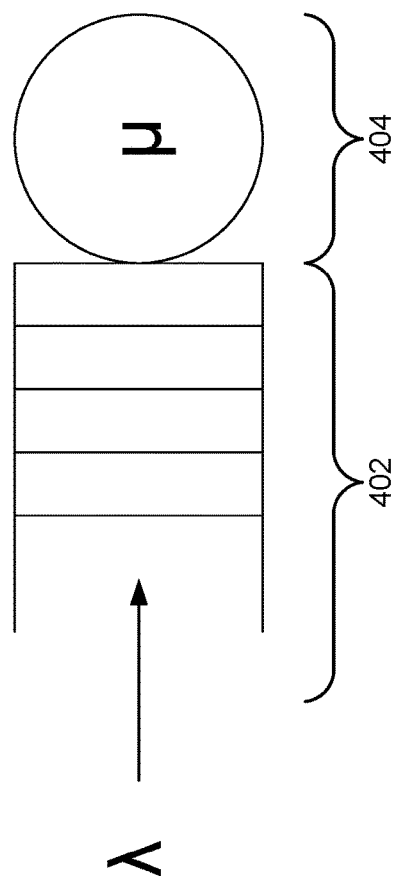
FIG. 4 illustrates a diagram of an example M/M/1 queueing model, according to an example of the principles described herein.

FIG. 4 illustrates a diagram of an example M/M/1 queueing model 400, according to an example of the principles described herein. Because the example described herein may be best described in connection with data packet processing at the server(s) 104, the example of FIG. 4 will be described in connection with the server(s) 104 as opposed to the client devices 102. However, the systems and methods described in connection with the server(s) 104 is equally applicable in the context of the client devices 102 and vice versa. FIG. 4 provides a depiction of the Kendall notation used to describe and classify a queueing node such as the client devices 102 and the server(s) 104. In one example, a queueing scenario may be modeled where a CPU (e.g., the processor(s) 202, 302) includes a queue of data packets waiting to be processed (e.g., decrypted). There may be two types of data packets in the queue as described herein including HP data packets sent via the HP channel 108 and LP data packets sent via the LP channel 110. When a data processing instance is completed as to a first data packet, the CPU may pick a next or second data packet from the queue (e.g., the queue component 220, 320). If there are data packets with high priority in the queue, the CPU chooses one of those with high priority. Otherwise, if no high priority data packet exists in the queue, the CPU chooses one of a number of lower priority packets existent within the queue. In this manner and based on any policies enforced as to the queue, as long as there are high priority data packets in the queue, any lower priority data packets are not processed (e.g., decrypted, forwarded, etc.).

Considering, for example, an M/M/1 queuing system in Kendall's notation, the first character (e.g., "M") denotes a distribution of intra-packet arrival times, and the second character (e.g., "M") is a service time distribution (e.g., an exponential distribution). The last character denotes a number of service processors within the system. Additional characters may be used in connection with this nomenclature including characters that denote system capacity, population size, and service discipline.

In the queueing system depicted in FIG. 4, the processing of a data packet may occur in two stages including: 1) waiting in queue as designated by 402; and 2) processing by a service node 404 (e.g., the server(s) 104). For simplicity, consider an example and associated model where a single server 104 is utilized. This single server 104 may utilize a single CPU (e.g., the single server being designated as "1" in the last character within M/M/1) or one-threaded application so that server 104 may process one data packet at a time. Further, in this example, consider for this purpose that the server 104 engages in data packet decryption processing noting that data decryption affects service rate. However, the present systems and methods apply to any number of server(s) 104 with any number of CPUs or one-threaded applications that may process any number of data packets at a time and engage in any number or type of data packet processing.

In the M/M/1 queueing system and an M/M/1 queue is a stochastic process whose state space is the set {0, 1, 2, 3, . . . } where the value corresponds to the number of data packets in the system including any currently in service. An M/M/1 system represents a system where queue length is 1 and that includes a single server, where arrivals are determined by a Poisson process and job service times have an exponential distribution. M stands for "memoryless" meaning that distribution is exponential. Thus, in the case of an M/M/1 queueing system, both arrivals times and service times are distributed exponentially. Further, the last number designated in M/M/1 is a number of servers (CPUs) which, in this example, was selected to be 1. For the M/M/1 modelling the queue is considered to be infinite.

Stated another way, arrivals occur at rate $\lambda$ according to a Poisson process and move the process from state i to i+1. Service times have an exponential distribution with rate parameter $\mu$ (e.g., service rate) in the M/M/1 queue, where $1/\mu$ is the mean service time. A single server serves customers one at a time from the front of the queue, according to a first-come, first-served discipline. When the service is complete the customer leaves the queue and the number of customers in the system reduces by one. Again, the buffer is of infinite size, so there is no limit on the number of customers the buffer can contain.

With the above understanding, the density of exponential distribution with a parameter $\mu$, is:

$$f(t)=\mu e^{-\mu t}, \text{ where } t>0 \qquad \text{Eq. 1}$$

Expectation of this distribution may be defined as follows:

$$E(X) = \frac{1}{\mu} \qquad \text{Eq. 2}$$

The variance of the exponential distribution may be defined as follows:

$$\sigma^2(X) = \frac{1}{\mu^2} \qquad \text{Eq. 3}$$

The service time may be distributed as exponential distribution with parameter $\mu$, and inter-packet arrival time may be distributed as exponential distribution with parameter $\lambda$. The mean time between data packet arrivals may be defined as $1/\lambda$ and mean service time is $1/\mu$. The fraction of time (e.g., traffic intensity) the server 104 is working is:

$$\rho = \frac{\lambda}{\mu} \qquad \text{Eq. 4}$$

In one example, $\rho<1$. Otherwise, the size of the queue may become too large.

Let L be a random variable that denotes the number of data packets in the system (e.g., at the server 104) in both the queue and in service. Let S be a random variable that denotes sojourn time of a data packet in the system. To demonstrate the impact of the present systems and methods relevant measures may be quantified including, for example, measuring a mean sojourn time of a data packet designated as E(S). The mean sojourn time of a data packet E(S) demonstrates how much time it takes on average between the moment when a data packet arrives at the queue of the server 104 and when and including the time it gets processed (e.g., decrypted, forwarded, etc.) by the server 104. Further, a mean number of data packets in the system may be represented by E(L). A formula that establishes a relationship between the mean number of packets in the system E(L), the mean sojourn time in the system E(S), and average number of incoming packets per time unit $\lambda$ may include Little's law as follows:

$$E(L)=\lambda E(S) \qquad \text{Eq. 5}$$

When considering two types of data packets including HP data packets sent via the HP channel 108 and LP data packets sent via the LP channel 110, an index of 1 may be used for HP data packets, and an index of 2 may be used for the LP data packets. HP data packets may have an arrival rate of $\lambda_1$. Further, LP data packets may have an arrival rate of $\lambda_2$.

$$\rho_1 = \frac{\lambda_1}{\mu} \qquad \text{Eq. 6}$$

and $$\rho_2 = \frac{\lambda_2}{\mu} \qquad \text{Eq. 7}$$

When a data packet of type 1 (e.g., an HP data packet) arrives at the queue of the server 104, the HP data packet may find another data packet of lower priority (e.g., an LP data packet) being processed by the server 104. In this case, the HP data packet will need to wait a period of time defined by $1/\mu$. The chance of this scenario occurring equal to an amount of time the server 104 spends on processing type 2 data packets (e.g., LP data packets) which is equal to $\rho_2$. If there are other data packets of high priority then it has to wait for them to finish processing, which will take a period of time defined as follows:

$$E(L_1)\frac{1}{\mu} \qquad \text{Eq. 8}$$

Further, processing the HP data packet that has had to wait in the waiting area 402 may require a time period defined by $1/\mu$. These wait times may be expressed in an overall formula as follows:

$$E(S_1) = E(L_1)\frac{1}{\mu} + \frac{1}{\mu} + \rho_2\frac{1}{\mu} \qquad \text{Eq. 9}$$

The above information may be combined with Little's law as reviewed as follows:

$$E(L_1) = \lambda E(S_1) \qquad \text{Eq. 10}$$

to obtain the following:

$$E(S_1) = \frac{(1+\rho_2)}{(1-\rho_1)\mu} \qquad \text{Eq. 11}$$

and $$E(L_1) = \frac{(1+\rho_2)\rho_1}{(1-\rho_1)} \qquad \text{Eq. 12}$$

In M/M/1 systems with no priority the following equation holds true:

$$E(L) = \frac{\rho}{(1-\rho)} \qquad \text{Eq. 13}$$

Having identified a mean sojourn time and average number of data packets for HP data packet sent via the HP channel 108, similar analysis and mathematical expressions may be derived for LP data packets sent via the LP channel 110. A total number of data packets in the system (e.g., the server 104) does not depend on an order in which they are served, and so it is same as in the system where data packets are served in an order of arrival as follows:

$$E(L_1) + E(L_2) = \frac{\rho_1 + \rho_2}{1 - \rho_1 - \rho_2} \qquad \text{Eq. 14}$$

From combining Eqs. 13 and 14, estimates of LP data packets may be derived as follows:

$$E(L_2) = \frac{(1-\rho_1(1-\rho_1-\rho_2))\rho_2}{(1-\rho_1)(1-\rho_1-\rho_2)} \qquad \text{Eq. 15}$$

From combining Eqs. 5 (Little's Law) and 15, we obtain the following:

$$E(S_2) = \frac{(1-\rho_1(1-\rho_1-\rho_2))}{(1-\rho_1)(1-\rho_1-\rho_2)\mu} \qquad \text{Eq. 16}$$

Consider an example system that can decrypt $\mu=4000$ packets per second (packets/sec). In this example, the system may handle a packet stream that has and arrival rate of $\lambda_1=1000$ packet/sec of HP packets and $\lambda_2=2000$ packets/sec of LP packets. Applying Eqs. 11 and 16 to an example, an average time a data packet of each type (e.g., HP data packets and LP data packets) may spend in the system (e.g., the server 104) may be determined.

$$E(S_1)=0.5 \text{ ms} \qquad \text{Eq. 17}$$

$$E(S_2)=1.25 \text{ ms} \qquad \text{Eq. 18}$$

A HP data packet may spend 0.5 milliseconds (ms) in a system compared to 1.25 ms for LP data packets. In contrast, in an example where a multiplexed communication channel 112 including the HP channel 108 and the LP channel 110 are not employed (e.g., where the present systems and methods are not used), the outcome would be equal to using just the HP data. Thus, if $\rho_2=0$ is set and applied to the formula for $E(S_1)$, the following is obtained:

$$E(S) = \frac{1}{(1-\rho)\mu} \qquad \text{Eq. 19}$$

In this example, indexes have been removed because the indexes are not required when only one type of data packet exists. Empirically, for this system, when $\lambda_1=1000$ and $\lambda_2=2000$ we may translate it to system where $\lambda=3000$, because no distinguishing between data packets is performed. In this example, an average time the data packets spend in the system (e.g., the servers 104) may be $E(S)=1$ ms applying Eq. 19.

In summary, if data packets are not segregated based on priority through the use of the HP channel 108 and the LP channel 110 an average wait of 1 ms is the outcome. However, if the data packets are divided based on priority and the data packets are transmitted from the client devices 102 to the server 104 via the HP channels 108 and LP channels 110 and queued based on their priorities and processed based on the policies described herein, a HP data packet may wait 0.5 ms, while LP data packets may wait 1.25 ms. Thus, through the use of the systems and methods described herein, and in the context of the above example, wait times in queueing and processing HP data packets results in a significant decrease in total processing time as compared to instances in which the systems and methods are not employed, and, on average, a decrease in time for HP data packets to be processed is realized by a factor of two. In this simple example, a significant improvement in processing time of data packets is realized. The concepts and methods described in connection with the above example may be similarly realized for other systems that employ a different number of service processors within the system or otherwise differ from the above example.

Figure 5:
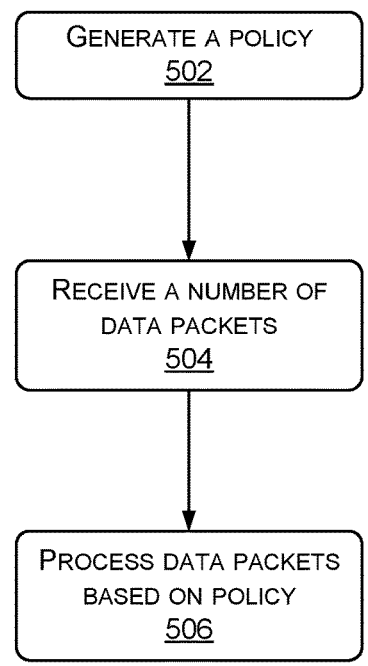
FIG. 5 illustrates a flow diagram of an example method for defining priority of a number of data packets within a queue, according to an example of the principles described herein.

FIG. 5 illustrates a flow diagram of an example method 500 for defining priority of a number of data packets within a queue, according to an example of the principles described herein. The method 500 may include, at 502, generating a policy. Any number of policies may be generated for the purpose of identifying priority data packets, identifying applications from which priority data packets may be obtained, and transmitting those priority data packets via the HP channel 108. The policy also defines which data packets, applications, etc. should be identified as low priority and transmitted via the LP channel 110.

The policies define a first multiplexed channel 108 of a plurality of multiplexed channels. The first multiplexed channel 108 has a first priority. The policies also define a second multiplexed channel 110 of the plurality of multiplexed channels. The second multiplexed channel 110 has a second priority. The first priority may be defined as being of a higher priority relative to the second multiplexed channel. Thus, the first priority may be associated with the HP data packets sent via the HP channel 108 of the multiplexed communication channel 112, and the second priority may be associated with the LP data packets sent via the LP channel 110 of the multiplexed communication channel 112.

The method 500 may also include, at 504, receiving a number of data packets over the plurality of multiplexed channels associated with a session. Throughout the present description, a session may be defined as a semi-permanent interactive information exchange between communicating devices such as the client devices 102 and the server(s) 104. Thus, in situations where a number of HP data packets are sent from the same application such as a real-time communications application, those HP data packets may be queued and processed before or with a higher priority than any LP data packets.

At 506, the method 500 may include processing the number of data packets transmitted via the first multiplexed channel 108 prior to processing the number of data packets transmitted via the second multiplexed channel 110 based at least in part on the policy. As noted above, the policies may define how many HP data packets are processed before the LP data packets.

Figure 6:
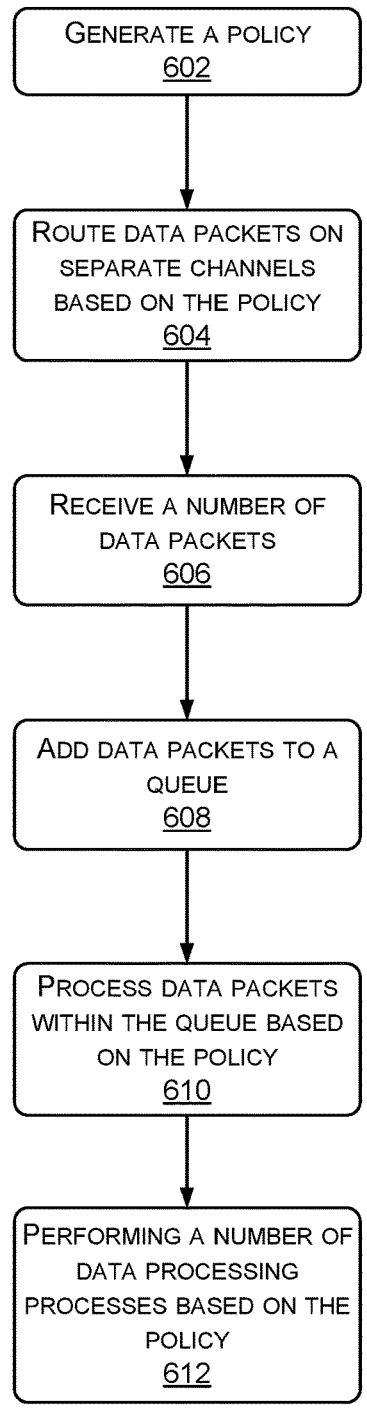
FIG. 6 illustrates a flow diagram of an example method for defining priority of a number of data packets within a queue, according to an example of the principles described herein.

FIG. 6 illustrates a flow diagram of an example method 600 for defining priority of a number of data packets within a queue, according to an example of the principles described herein. The method 600 may include, at 602, generating a policy. Again, any number of policies may be generated, and any number of those policies generated may be utilized in the processing of data packets according to the present systems and methods.

At 604, the number of data packets are routed on the first multiplexed channel (e.g., the HP channel 108) and the second multiplexed channel (e.g., 110) based on at least the policies. Stated another way, the multiplexed communication channel 112 including the HP channel 108 and the LP channel 110 may be used to transmit data packets. The HP channel 108 transmits HP data packets, and the LP channel 110 transmits LP data packets.

The client device 102 and the server(s) 104 are both capable of receiving, at 606, a number of data packets over the plurality of multiplexed channels 108, 110 associated with a session. Although the client devices 102 are capable of receiving the data packets over the multiplexed communication channel 112, the server(s) 104 may receive, from a plurality of the client devices 102, a number of data packets over the plurality of multiplexed channels associated with the session, and the examples described here in connection with FIG. 6 will be described in connection with the server(s) 104 receiving the data packets since the advantages of the present systems and methods may be better realized from the perspective of the server(s) 104.

The plurality of multiplexed channels include a first multiplexed channel having a first priority such as the HP channel 108 described herein. Further, the plurality of multiplexed channels include a second multiplexed channel having a second priority such as the LP channel 110 described herein. The first multiplexed channel may be designated as having a higher priority relative to the second multiplexed channel. Thus, any data packets sent over the first multiplexed channel may be designated as having a higher priority relative to any data packets sent over the second multiplexed channel.

At 608, the number of data packets transmitted over the plurality of multiplexed channels may be added to a queue such as the queue component 220, 320. The queue may include one or more data packets that are queued within the queue based on their priority level. In one example, the queue component 220 may include regions of physical memory to store HP data packets sent via the HP channel 108 of the multiplexed communication channel 112 and regions of physical memory to store LP data packets sent via the LP channel 110 of the multiplexed communication channel 112.

The data packets in the queue may be processed at 610 based at least in part on the policies generated at 602. In one example, the policies may define that B-number of HP data packets transmitted via the first multiplexed channel (e.g., the HP channel 108) are to be processed before c-number of LP data packets transmitted via the second multiplexed channel (e.g., the LP channel 110). In one example, the policies may define that B-number of bytes of HP data packets transmitted via the first multiplexed channel (e.g., the HP channel 108) are to be processed before c-number of bytes of LP data packets transmitted via the second multiplexed channel (e.g., the LP channel 110). Further, the policies may define prioritization of a first session of the plurality of sessions over a second session of the plurality of sessions. In this example, the sessions may include sessions invoked by a number of applications such as, for example, real-time communications such as, for example, a videoconferencing instance (e.g., Webex teleconferencing system developed and distributed by Cisco Systems, Inc.) where these data packets may be assigned high priority within the policy or policies, and data packets associated with a media streaming service (e.g., Netflix), email services (e.g., Microsoft Outlook mail server), and web traffic (e.g., web downloads) which may be assigned low priority. Any other policies may be used to prioritize for the processing of HP data packets over LP data packets within the queue.

The method 600 may further include performing a number of data processing processes at 612 based on the policies. The data processing processes may include, for example, cryptographic processing including encrypting the number of data packets, decrypting the number of data packets, decapsulation of the data packets, forwarding of the data packets, and combinations thereof.

Figure 7:
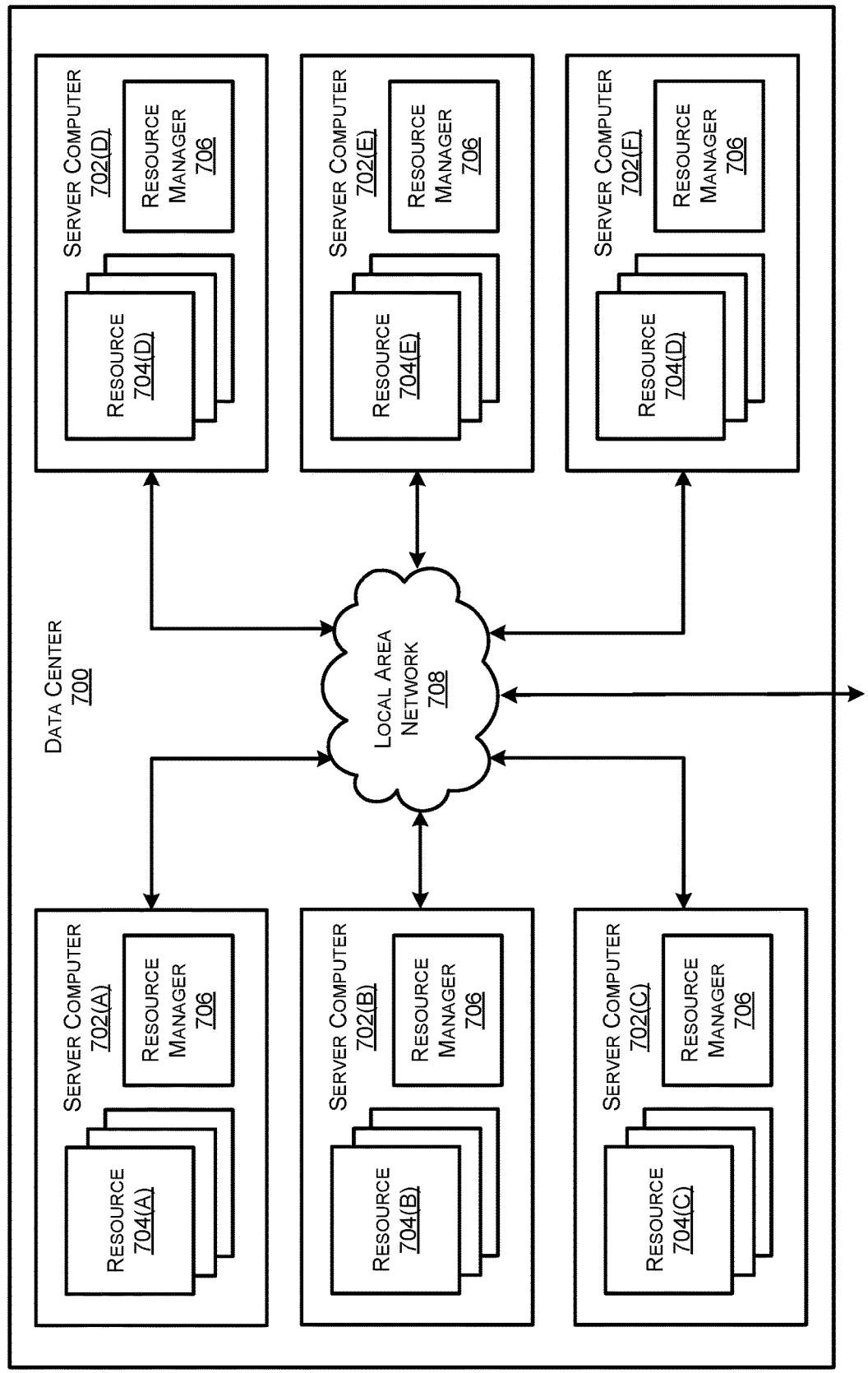
FIG. 7 illustrates a computing system diagram illustrating a configuration for a data center that may be utilized to implement aspects of the technologies disclosed herein.

FIG. 7 illustrates a computing system diagram illustrating a configuration for a data center 700 that may be utilized to implement aspects of the technologies disclosed herein. The example data center 700 shown in FIG. 7 includes several server computers 702A-702F (which might be referred to herein singularly as "a server computer 702" or in the plural as "the server computers 702) for providing computing resources. In some examples, the resources and/or server computers 702 may include, or correspond to, any type of networked device described herein. Although described as servers, the server computers 702 may comprise any type of networked device, such as servers, switches, routers, hubs, bridges, gateways, modems, repeaters, access points, etc.

The server computers 702 may be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, virtual private networks (VPNs), and others. Some of the server computers 702 may also be configured to execute a resource manager 706 capable of instantiating and/or managing the computing resources. In the case of VM instances, for example, the resource manager 706 may be a hypervisor or another type of program configured to enable the execution of multiple VM instances on a single server computer 702. Server computers 702 in the data center 700 may also be configured to provide network services and other types of services.

In the example data center 700 shown in FIG. 7, an appropriate LAN 708 is also utilized to interconnect the server computers 702A-702F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 700, between each of the server computers 702A-702F in each data center 700, and, potentially, between computing resources in each of the server computers 702. It may be appreciated that the configuration of the data center 700 described with reference to FIG. 7 is merely illustrative and that other implementations may be utilized.

In some examples, the server computers 702 and or the computing resources 704 may each execute/host one or more tenant containers and/or virtual machines to perform techniques described herein.

In some instances, the data center 700 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 704 provided by the cloud computing network may include various types of computing resources, such as data processing resources like tenant containers and VM instances, data storage resources, networking resources, data communication resources, network services, VPN instances, and the like.

Each type of computing resource 704 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 704 not mentioned specifically herein.

The computing resources 704 provided by a cloud computing network may be enabled in one example by one or more data centers 700 (which might be referred to herein singularly as "a data center 700" or in the plural as "the data centers 700). The data centers 700 are facilities utilized to house and operate computer systems and associated components. The data centers 700 typically include redundant and backup power, communications, cooling, and security systems. The data centers 700 may also be located in geographically disparate locations. One illustrative example for a data center 700 that may be utilized to implement the technologies disclosed herein is described herein with regard to, for example, FIGS. 1 through 6.

Figure 8:
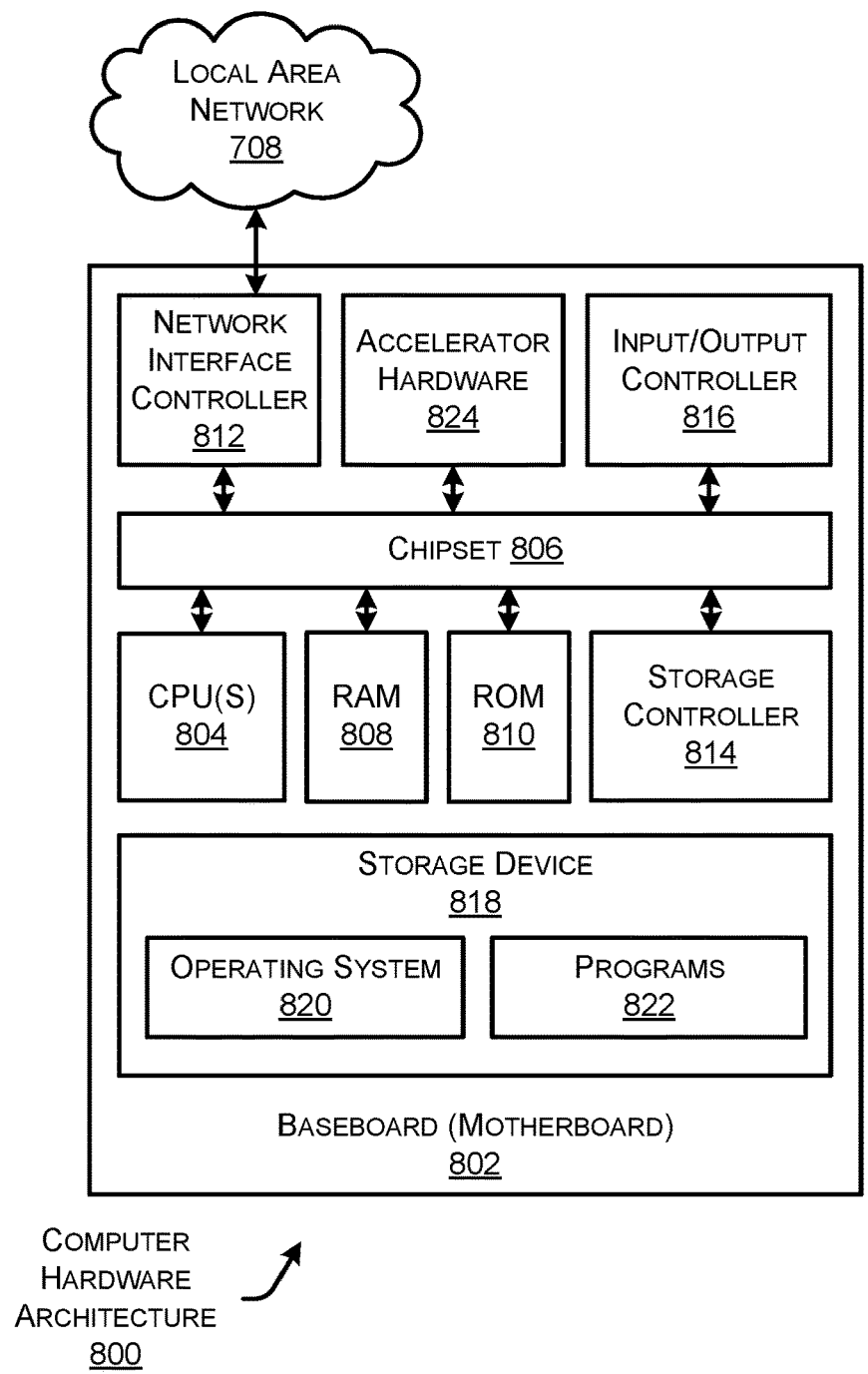
FIG. 8 illustrates a computer architecture diagram showing an example computer hardware architecture for implementing a computing device that may be utilized to implement aspects of the various technologies presented herein.

FIG. 8 illustrates a computer architecture diagram showing an example computer hardware architecture 800 for implementing a computing device that may be utilized to implement aspects of the various technologies presented herein. The computer hardware architecture 800 shown in FIG. 8 illustrates the client devices 102, the network 106, the server(s) 104, and/or other systems or devices associated with the client devices 102, the network 106, and/or the server(s) 104 and/or remote from the client devices 102, the network 106, and/or the server(s) 104, a workstation, a desktop computer, a laptop, a tablet, a network appliance, an e-reader, a smartphone, or other computing device, and may be utilized to execute any of the software components described herein. The computer 800 may, in some examples, correspond to a network device (e.g., the client devices 102, the network 106, and/or the server(s) 104 (and associated devices) described herein, and may comprise networked devices such as servers, switches, routers, hubs, bridges, gateways, modems, repeaters, access points, etc.

The computer 800 includes a baseboard 802, or "motherboard," which is a printed circuit board to which a multitude of components or devices may be connected by way of a system bus or other electrical communication paths. In one illustrative configuration, one or more central processing units (CPUs) 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the client device 102, the network 106, and/or the server(s) 104, among other devices. The chipset 806 may include functionality for providing network connectivity through a Network Interface Controller (NIC) 812, such as a gigabit Ethernet adapter. The NIC 812 is capable of connecting the computer 800 to other computing devices within the client device 102, the network 106, and/or the server(s) 104 and external to the client device 102, the network 106, and/or the server(s) 104. It may be appreciated that multiple NICs 812 may be present in the computer 800, connecting the computer to other types of networks and remote computer systems. In some examples, the NIC 812 may be configured to perform at least some of the techniques described herein, such as packet redirects and/or other techniques described herein.

The computer 800 may be connected to a storage device 818 that provides non-volatile storage for the computer. The storage device 818 may store an operating system 820, programs 822 (e.g., any computer-readable and/or computer-executable code described herein), and data, which have been described in greater detail herein. The storage device 818 may be connected to the computer 800 through a storage controller 814 connected to the chipset 806. The storage device 818 may consist of one or more physical storage units. The storage controller 814 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 may store data on the storage device 818 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 818 is characterized as primary or secondary storage, and the like.

For example, the computer 800 may store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the storage device 818 by detecting the physical states or characteristics of one or more particular locations within the physical storage units.

In addition to the storage device 818 described above, the computer 800 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 800. In some examples, the operations performed by the client device 102, the network 106, the server(s) 104, and/or any components included therein, may be supported by one or more devices similar to computer 800. Stated otherwise, some or all of the operations performed by the client device 102, the network 106, the server(s) 104, and/or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 818 may store an operating system 820 utilized to control the operation of the computer 800. According to one example, the operating system 820 comprises the LINUX operating system. According to another example, the operating system comprises the WINDOWS® SERVER operating system from MICROSOFT Corporation of Redmond, Washington According to further examples, the operating system may comprise the UNIX operating system or one of its variants. It may be appreciated that other operating systems may also be utilized. The storage device 818 may store other system or application programs and data utilized by the computer 800.

In one example, the storage device 818 or other computer-readable storage media is encoded with computer-executable instructions which, when loaded into the computer 800, transform the computer from a general-purpose computing system into a special-purpose computer capable of implementing the examples described herein. These computer-executable instructions transform the computer 800 by specifying how the CPUs 804 transition between states, as described above. According to one example, the computer 800 has access to computer-readable storage media storing computer-executable instructions which, when executed by the computer 800, perform the various processes described above with regard to FIGS. 1 through 6. The computer 800 may also include computer-readable storage media having instructions stored thereupon for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, an input/output controller 816 may provide output to a display, such as a computer monitor, a flat-panel display, a digital projector, a printer, or other type of output device. It will be appreciated that the computer 800 might not include all of the components shown in FIG. 8, may include other components that are not explicitly shown in FIG. 8, or might utilize an architecture completely different than that shown in FIG. 8.

The computer 800 may also include accelerator hardware 824 such as, for example, field programmable gate arrays (FPGAs), and graphics processing units (GPUs), among other accelerator hardware devices. The accelerator hardware 824 may be employed in order to perform some functions in a more efficient manner.

As described herein, the computer 800 may comprise one or more of the client device 102, the network 106, the server(s) 104, and/or other systems or devices associated with the client device 102, the network 106, and/or the server(s) 104 and/or remote from the client device 102, the network 106, and/or the server(s) 104. The computer 800 may include one or more hardware processor(s) such as the CPUs 804 configured to execute one or more stored instructions. The CPUs 804 may comprise one or more cores. Further, the computer 800 may include one or more network interfaces configured to provide communications between the computer 800 and other devices, such as the communications described herein as being performed by the client device 102, the network 106, the server(s) 104, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for the client device 102, the network 106, and/or the server(s) 104 as described herein. The programs 822 may enable the devices described herein to perform various operations.

CONCLUSION

The examples described herein provide a systems, methods, and computer program products including a processor, and a non-transitory computer-readable media storing instructions that, when executed by the processor, causes the processor to perform operations. The operations include generating a policy. The policy defines a first multiplexed channel of a plurality of multiplexed channels. The first multiplexed channel includes a first priority. The policy also defines a second multiplexed channel of the plurality of multiplexed channels. The second multiplexed channel includes a second priority. The first priority is defined as being of a higher priority relative to the second priority. The operations further include receiving a number of data packets over the plurality of multiplexed channels associated with a session, and processing the number of data packets transmitted via the first multiplexed channel prior to processing the number of data packets transmitted via the second multiplexed channel based at least in part on the policy.

The number of data packets are routed on the first multiplexed channel and the second multiplexed channel based on at least the policy. The operations further comprising performing a cryptographic process based on the policy. The cryptographic process includes encrypting the number of the data packets, decrypting the number of the data packets, decapsulation, forwarding, and combinations thereof.

The operations further include adding the number of data packets transmitted over the plurality of multiplexed channels to a queue and processing the number of data packets within the queue based at least in part on the policy. The policy defines m-number of high-priority packets transmitted via the first multiplexed channel are to be processed before n-number of low-priority packets transmitted via the second multiplexed channel. The policy defines m-number of bytes of high-priority packets transmitted via the first multiplexed channel are to be processed before n-number of bytes of low-priority packets transmitted via the second multiplexed channel. The session includes a plurality of sessions, and the policy defines prioritization of a first session of the plurality of sessions over a second session of the plurality of sessions. The first session is associated with a live session where data is transmitted in real time, and the second session is associated with a non-live session where data is transmitted at non-real time instances.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A non-transitory computer-readable medium storing instructions that, when executed, causes a processor to perform operations, comprising:
   receiving a policy, the policy defining whether date packets are sent over a first multiplexed channel and a second multiplexed channel based at least on part on applications from which data packets are generated, wherein:
   the first multiplexed channel has a first priority, and
   the second multiplexed channel has a second priority, the first multiplexed channel being designated as having a higher priority relative to the second multiplexed channel;
   routing the data packets over the first multiplexed channel and the second multiplexed channel based at least in part on the policy; and
   processing the data packets transmitted via the first multiplexed channel prior to processing the data packets transmitted via the second multiplexed channel based at least in part on the policy, the policy further defining processing the data packets with a queue based at least in part on:
   a first mean sojourn time and a first average number of data packets for high priority (HP) data packets sent via the first multiplexed channel; and
   a second mean sojourn time and a second average number of data packets for low priority (LP) data packets sent via the second multiplexed channel.

2. The non-transitory computer-readable medium of claim 1, wherein the policy defines m-number of high-priority packets transmitted via the first multiplexed channel are to be processed before n-number of low-priority packets transmitted via the second multiplexed channel.

3. The non-transitory computer-readable medium of claim 1, wherein the policy defines m-number of bytes of high-priority packets transmitted via the first multiplexed channel are to be processed before n-number of bytes of low-priority packets transmitted via the second multiplexed channel.

4. The non-transitory computer-readable medium of claim 1, wherein:
   routing the data packets comprises routing the data packets over a plurality of sessions, and
   the policy defines prioritization of a first session of the plurality of sessions over a second session of the plurality of sessions.

5. The non-transitory computer-readable medium of claim 1, the operations further comprising performing a cryptographic process based at least in part on the policy, the cryptographic process including decrypting the number of data packets, decapsulation, forwarding, and combinations thereof.

6. The non-transitory computer-readable medium of claim 1, the operations further comprising:
   adding the number of data packets transmitted over the first multiplexed channel and the second multiplexed channel to the queue; and processing the number of data packets within the queue based at least in part on the policy.

7. A system comprising:
a processor; and
a non-transitory computer-readable media storing instructions that, when executed by the processor, causes the processor to perform operations comprising:
receiving a policy, the policy defining whether date packets are sent over a first multiplexed channel and a second multiplexed channel based at least on part on applications from which data packets are generated, wherein:
the first multiplexed channel has a first priority;
the second multiplexed channel has a second priority, and
the first priority is defined as being of a higher priority relative to the second priority;
routing the data packets over the first multiplexed channel and the second multiplexed channel based at least in part on the policy;
adding the data packets transmitted over the first multiplexed channel and the second multiplexed channel to a queue; and
processing, at the queue, the data packets transmitted via the first multiplexed channel prior to processing the data packets transmitted via the second multiplexed channel based at least in part on the policy, the policy further defining processing the data packets with the queue based at least in part on:
a first mean sojourn time and a first average number of data packets for high priority (HP) data packets sent via the first multiplexed channel; and
a second mean sojourn time and a second average number of data packets for low priority (LP) data packets sent via the second multiplexed channel.

8. The system of claim 7, the operations further comprising performing a cryptographic process based on the policy, the cryptographic process including encrypting the number of the data packets, decrypting the number of the data packets, decapsulation, forwarding, and combinations thereof.

9. The system of claim 7, wherein the policy defines m-number of high-priority packets transmitted via the first multiplexed channel are to be processed before n-number of low-priority packets transmitted via the second multiplexed channel.

10. The system of claim 7, wherein the policy defines m-number of bytes of high-priority packets transmitted via the first multiplexed channel are to be processed before n-number of bytes of low-priority packets transmitted via the second multiplexed channel.

11. The system of claim 7, wherein:
routing the data packets comprises routing the data packets over a plurality of sessions, and
the policy defines prioritization of a first session of the plurality of sessions over a second session of the plurality of sessions.

12. The system of claim 11, wherein:
the first session is associated with a live session where data is transmitted in real time, and
the second session is associated with a non-live session where the data is transmitted at non-real time instances.

13. A method of defining priority of a number of data packets within a queue, comprising:
receiving a policy, the policy defining whether date packets are sent over a first multiplexed channel and a second multiplexed channel based at least on part on applications from which the data packets are generated, wherein:
the first multiplexed channel has a first priority; and
the second multiplexed channel has a second priority, and
wherein the first priority is defined as being of a higher priority relative to the second priority;
routing the data packets over the first multiplexed channel and the second multiplexed channel based at least in part on the policy;
adding the number of data packets transmitted over the first multiplexed channel and the second multiplexed channel to the queue; and
processing, at the queue, the number of data packets transmitted via the first multiplexed channel prior to processing the number of data packets transmitted via the second multiplexed channel based at least in part on the policy, the policy further defining processing the data packets with the queue based at least in part on:
a first mean sojourn time and a first average number of data packets for high priority (HP) data packets sent via the first multiplexed channel; and
a second mean sojourn time and a second average number of data packets for low priority (LP) data packets sent via the second multiplexed channel.

14. The method of claim 13, further comprising performing a cryptographic process based on the policy, the cryptographic process including encrypting the number of the data packets, decrypting the number of the data packets, decapsulation, forwarding, and combinations thereof.

15. The method of claim 13, wherein:
routing the data packets comprises routing the data packets over a plurality of sessions,
the policy defines prioritization of a first session of the plurality of sessions over a second session of the plurality of sessions,
the first session is associated with a live session where data is transmitted in real time, and
the second session is associated with a non-live session where the data is transmitted at non-real time instances.

* * * * *